(No Model.)

C. ROCHETTE.
METHOD OF FORMING HEEL STIFFENERS FOR BOOTS OR SHOES.

No. 276,717. Patented May 1, 1883.

Witnesses:
A. Harvey
L. E. Noël

C. Rochette
Inventor,
By J. Boursolle
Atty.

UNITED STATES PATENT OFFICE.

CLEOPHAS ROCHETTE, OF ST. SAUVEUR, QUEBEC, CANADA.

METHOD OF FORMING HEEL-STIFFENERS FOR BOOTS OR SHOES.

SPECIFICATION forming part of Letters Patent No. 276,717, dated May 1, 1883.

Application filed December 21, 1882. (No model.)

*To all whom it may concern:*

Be it known that I, CLEOPHAS ROCHETTE, of St. Sauveur, in the Province of Quebec, in the Dominion of Canada, have invented a certain new and useful Improvement in the Art of Manufacturing Laminated Stiffeners for Boots and Shoes, of which the following is a specification.

My invention relates to the manufacture of stiffeners composed of a number of layers or sheets of material at the different sides and placed one upon another.

The invention relates to an improved method of molding and uniting the several layers; and it consists in subjecting the same, after they are placed one upon another, to compression between a hard plate or surface upon one side and an elastic plate or surface upon the other, the material used being ordinarily a metallic plate and a plate or block of soft or elastic wood.

Figure 1:
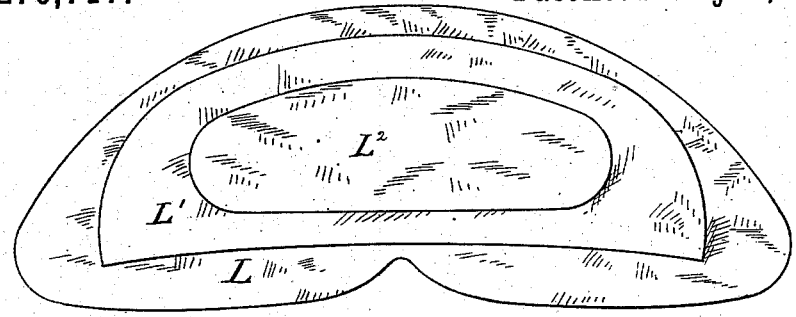
Figure 2:
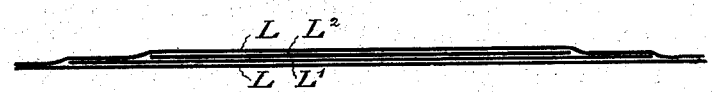
Figures 3, 4:
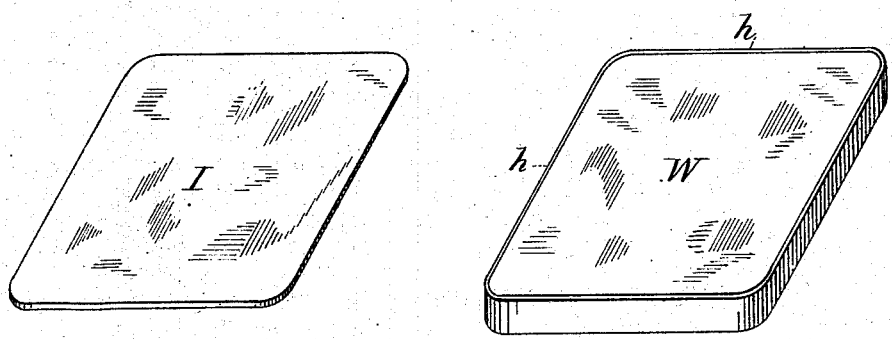
Figure 5:
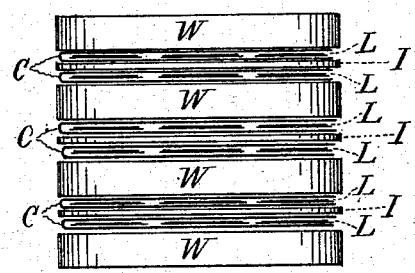

Figure 1 is a view of my improved stiffener with the top layer removed. Fig. 2 is a section showing the layers of which the stiffener is composed. Fig. 3 is a view of a plate of iron or other hard unyielding material used for pressing the improved stiffener. Fig. 4 is a view of a plate of wood or other elastic material used for pressing the improved stiffener. Fig. 5 is a pile of plates ready for pressing.

The stiffener is composed of several pieces or layers of leather or other material, the aggregate thickness of which is equal to the thickness required in the stiffener, the individual pieces being therefore comparatively thin. The pieces or layers are also of various sizes, the smallest being placed inside between two outside full-sized pieces.

The stiffener illustrated in the drawings is composed of four layers or pieces of three different sizes, the external pieces, L L, being the full size of the stiffener, the two smaller ones, L' and L², being placed between them. When the layers or pieces are pasted and placed in their proper relative position they are pressed between two plates or blocks, one of which, I, has a hard and unyielding surface, such as iron. The other, W, is of a softer and yielding material—such as pine, poplar, or other reasonably soft and elastic wood—a piece or sheet of cloth, C, being placed interveningly between the surfaces of the plate and the stiffener, to facilitate the removal of the latter after pressing. The plates I and W, with the unfinished stiffeners between them, are then subjected to pressure in any suitable press, a number or pile, such as shown in Fig. 5, being pressed simultaneously.

The object of using a hard and a soft plate is that, after pressing, one side of the stiffener will be quite flat, while the other assumes a curved contour in consequence of the varying thickness produced by the various layers, the yielding surface of the soft plate being indented by the layers, thus producing a more even pressure over the whole surface, while with hard and unyielding surfaces alone the thickest parts only would be pressed. I find that iron and wood answers all practical purposes, respectively, for a non-yielding and a yielding plate. The latter, W, I bind with an iron hoop, $h$, to prevent their splitting under pressure.

It will be seen that on stiffeners made in this manner no joint appears on either surface; that a stiffener of any thickness can be produced with its edges tapering down to the thickness of the two external layers, or, if preferred, to one layer, in which case one of them is made somewhat less in size.

It will also be observed that in this manner small pieces of material, which might otherwise go to waste, may be utilized for the smaller internal layers.

I find that a piece of cloth placed between the surfaces of the plates and the stiffeners to be pressed prevents their adherence to the plates after pressing, and that the cloth can be more conveniently separated from the plates and the pressed stiffeners from the cloth. The introduction of this cloth, although desirable, is not a necessary feature of the process.

The result of my improved method of manufacture is a well-shaped and well-consolidated stiffener, produced with comparatively little hand labor and partly out of waste materials.

I am aware that a stiffener has been composed of several layers of material, and this I do not broadly claim.

I am also aware that the stiffeners consisting of a single sheet with chamfered edges have been folded by rubber-faced jaws around an anvil or last, and this I do not claim, my invention relating to the treatment of the series of sheets or layers to reduce or bevel their edges without the labor expense of scarfing them; but What I do claim is—

1. The herein-described method of manufacturing laminated stiffeners, consisting in producing a series of sheets of different sizes, placing these one upon another, and finally subjecting the series to pressure between an elastic and a non-elastic surface, whereby the sheets are forced into intimate contact and their edges beveled.

2. As an improvement in the art of manufacturing laminated stiffeners for boots and shoes, the process of compressing and forming the same, consisting in placing the laminæ one upon another, applying a sheet of cloth to the outer surface of the body thus formed, and finally subjecting said sheets to compression between a yielding surface upon one side and an unyielding surface upon the other.

Signed at Ottawa this 23d day of November, 1882.

C. ROCHETTE.

In presence of—
WILFRID SAURIER,
A. HARVEY.